United States Patent
Wamprecht et al.

(10) Patent No.: US 6,251,985 B1
(45) Date of Patent: *Jun. 26, 2001

(54) AQUEOUS COATING COMPOSITION FOR STOVING FINISHES AND PROCESS FOR THE PRODUCTION THEREOF

(75) Inventors: Christian Wamprecht, Neuss (DE); Lothar Kahl, FRACC Atizapan de Zaragoza (MX); Bernd Klinksiek, Bergisch Gladbach (DE); Nusret Yuva, Wermelskirchen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/136,146

(22) Filed: Aug. 18, 1998

(30) Foreign Application Priority Data

Aug. 25, 1997 (DE) .............................. 197 36 920

(51) Int. Cl.$^7$ ..................................... C08L 51/00
(52) U.S. Cl. ................. 524/539; 524/591; 524/839; 524/840; 525/123; 525/124; 525/455
(58) Field of Search ................... 524/539, 591, 524/839, 840; 525/123, 124, 455

(56) References Cited

U.S. PATENT DOCUMENTS

| | | | |
|---|---|---|---|
| 4,147,679 | * 4/1979 | Scriven et al. | 524/839 |
| 4,543,144 | 9/1985 | Thoma et al. | 156/230 |
| 4,608,413 | 8/1986 | Nachtkamp et al. | 524/591 |
| 5,126,393 | 6/1992 | Blum et al. | 524/538 |
| 5,294,665 | 3/1994 | Pedain et al. | 576/591 |
| 5,342,882 | 8/1994 | Göbel et al. | 524/832 |
| 5,379,947 | 1/1995 | Williams et al. | 241/21 |
| 5,455,297 | 10/1995 | Pedain et al. | 524/591 |
| 5,470,906 | * 11/1995 | Craun et al. | 524/507 |
| 5,646,213 | * 7/1997 | Guo | 524/562 |
| 5,723,536 | 3/1998 | Baumbach et al. | 802/591 |
| 5,981,653 | * 11/1999 | Wilmes et al. | 524/839 |

FOREIGN PATENT DOCUMENTS

| | | |
|---|---|---|
| 2203868 | 10/1997 | (CA) . |
| 2829648 | 1/1980 | (DE) . |
| 195 23 084 | 4/1997 | (DE) . |
| 195 40 977 | 5/1997 | (DE) . |
| 101007 A2 | * 2/1984 | (EP) . |
| 714958 | 11/1995 | (EP) . |
| 863173 | 9/1998 | (EP) . |
| 96/37561 | 11/1996 | (WO) . |

OTHER PUBLICATIONS

Rosthauser et al., "Waterborne Polyurethanes" from Advances in Urethane Science and Technology, ed. K.C. Frisch et al., vo. 10, pp. 121–162, 1987.*

Organic Chemistry Methods, 4th edition, vol. E20, p. 1659 (month unavailable) 1987.

J. W. Rosthauser, K. Nachtkamp in Advances in Urethane Science and Technology, K.C. Frisch & D. Klempner, editors, vol. 10, pp. 121–162 (month unavailable) 1987.

* cited by examiner

*Primary Examiner*—Edward J. Cain
(74) *Attorney, Agent, or Firm*—Joseph C. Gil; Thomas W. Roy

(57) ABSTRACT

An aqueous coating composition including a combination of hydroxyl group-containing polyols and blocked polyisocyanate cross-linking agents, which dries preferably in pulverulent manner on the surface to be coated and, after stoving, affords coatings having a high resistance to water, chemicals and solvents, in particular on metallic substrates, and a process for the production of the coating composition.

6 Claims, No Drawings

AQUEOUS COATING COMPOSITION FOR STOVING FINISHES AND PROCESS FOR THE PRODUCTION THEREOF

FIELD OF THE INVENTION

The invention relates to an aqueous coating composition including hydroxyl group-containing polyols and blocked polyisocyanate cross-linking agents, which dries preferably in pulverulent manner on the surface to be coated and, after stoving, affords coatings having a high resistance to water, chemicals and solvents, in particular on metallic substrates. The invention also relates to a process for the production of the coating composition.

BACKGROUND OF THE INVENTION

Aqueous polyurethane dispersions are known (cf. Houben-Weyl, Methoden der organischen Chemie [Organic Chemistry Methods], 4th edition, Vol. E20, p. 1659 (1987)). However, unreactive polyurethanes have a number of weaknesses with regard to the high quality profile required by, for example, automotive finishing applications. These weaknesses are primarily due to insufficient cross-linking between the film-forming macromolecules which is manifested in reduced resistance to water, chemicals and solvents and in low-grade mechanical properties. The newer post-curing coating systems which are obtained, for example, by combining isocyanate-reactive resins with blocked polyisocyanate cross-linking agents, afford better properties (cf. J. W. Rosthauser, K. Nachtkamp in Advances in Urethane Science and Technology, K. C. Frisch and D. Klempner, editors, Vol. 10, pp. 121–162 (1987)).

Polyurethane, polyepoxy, polyester or polyacrylate resins and dispersions which are cross-linkable by way of hydroxyl groups are used as resins. The cross-linking agents are blocked polyisocyanates which have optionally been hydrophilically modified. Such systems are known from, for example, DE-A 4,213,527, EP-A 581 211, EP-A 427 028, U.S. Pat. No. 4,543,144, DE-A 3,345,448 and DE-A 2,829,648.

Systems which are considered for paint and coating applications have the property of demonstrating good film-forming properties even at room temperature. If this property is lacking, films having an overall poor quality profile result. This includes, in particular, poor coating flow and low gloss. In some instances, film-formation is also promoted by the addition of solvents and coalescing agents.

The application of powder coatings from the aqueous phase is described, for example, in DE-A 19,523,084, DE-A 19,540,977, EP-A 652,264, EP-A 714,958 and WO 96/37561. A disadvantage of these applications is that during production the extrusion of the binder is followed by a grinding operation which is very laborious and costly. Furthermore, the grinding operation sets limits on the fineness of powders, and this is often noticeable as inadequate sedimentation resistance in the resulting powder suspensions.

It has now been unexpectedly found that useful solvent-free coating dispersions which are based on selected polyhydroxyl components and blocked polyisocyanates, dry in pulverulent manner, are heat-curable can be obtained successfully and economically. The resulting products are useful coating compositions for processing as one-pack products and make it possible to produce coatings having particularly high-grade properties. It is noteworthy that the coating system contains no, or only very small quantities of, organic cosolvents and that coating films having very (good flow properties and a high gloss are obtained which are very highly resistant to water, solvents and chemicals.

A further advantage is the ability to process coatings produced according to the invention on existing wet-coating installations despite the fact that the binders dry in pulverulent manner. With good flow, thinner films are obtained than is the case with conventional powder coating, and spray-flushing the equipment and booths simplifies the cleaning operations in comparison with those of powder coating. Cleaning effort is also less than is the case with solvent-containing finishes owing to the absence of film formation or, compared with two-pack coatings, of cross-linking at room temperature.

The invention overcomes disadvantages of known methods for making water-borne systems. The production of known conventional water-borne coating systems which form films, even at room temperature, either requires considerable quantities of non-ionic emulsifiers, or the systems contain high levels of carboxyl groups which are neutralized with ammonia or amines (ionic emulsifiers). This frequently results in the formation of micro-bubbles during production and application of the coatings, and it is furthermore also the reason for the frequently poor water resistance of corresponding coating films. These coating systems moreover frequently have only a narrow application window (the range of temperature and relative atmospheric humidity at which application is possible) and have a pronounced tendency to form bubbles (boiling). The window is markedly more favourable in the case of binders which dry preferably in pulverulent manner. The surface properties are less dependent on climatic conditions (temperature, relative atmospheric humidity) during application. Greater film thicknesses can furthermore be achieved without the occurrence of boiling due to the evaporation of water.

SUMMARY OF THE INVENTION

The present invention provides an aqueous coating composition which is produced by combining:
A) a polyol component based on polyester polyols, polyacrylate polyols and/or polyester polyacrylate polyols having a hydroxyl group content of from 1.0 to 6.0 wt. %, a carboxyl group content of from 0 to 1.5 wt. %, a weight average molecular weight of 2000 to 50000 and a glass transition temperature that is $\geq 30°$ C.,
B) a polyisocyanate component having blocked isocyanate groups and based on (cyclo)aliphatic polyisocyanates having a blocked isocyanate group content of from 10.0 to 25.0 wt. %, with water to form an aqueous dispersion. The invention is also directed to a method of making the composition and a method of using the composition.

DETAILED DESCRIPTION OF THE INVENTION

The present invention provides an aqueous coating composition which dries in a pulverulent manner and is produced by combining:
A) a polyol component based on polyester polyols, polyacrylate polyols and/or polyester polyacrylate polyols having a hydroxyl group content of from 1.0 to 6.0 wt. %, a carboxyl group content of from 0 to 1.5 wt. %, a weight average molecular weight of 2000 to 50000 and a glass transition temperature $\geq 30°$ C.,
B) a polyisocyanate component having blocked isocyanate groups and based on (cyclo)aliphatic polyisocyanates having a blocked isocyanate group content of from 10.0 to 25.0 wt. %, C) optionally further polyfunctional polyols, D) optionally further cross-linking substances, E) optionally external emulsifiers and F) optionally conventional additives such as, for example, neutralizing agents, catalysts, auxiliary substances and/or additives such as degassing agents, flow promoters, radical interceptors, antioxidants and/or UV absorbers, thickeners, small quantities of solvents and biocides, with water to form an aqueous dispersion. The dispersion can be prepared by either a direct dispersing process or by a phase reversal process, preferably by means of a dispersing device having a volume-related dispersing power of 1×10 to 9.8×10000 W/cm$^3$.

The composition has an average dispersion particle size diameter of from 0.05 to 10 μm, preferably 0.1 to 5 μm, more preferably about 0.15 to 2.5 μm and more preferably 0.2 to 1.5 μm and dries preferably in a pulverulent manner.

The present invention also provides a method for making an aqueous coating composition that dries in a pulverulent manner by combining:

A) a polyol component based on polyester polyols, polyacrylate polyols and/or polyester polyacrylate polyols having a hydroxyl group content of from 1.0 to 6.0 wt. %, a carboxyl group content of from 0 to 1.5 wt. %, a weight average molecular weight of 2000 to 50000 and a glass transition temperature that is $\geq$30° C., B) a polyisocyanate component having blocked isocyanate groups and based on (cyclo)aliphatic polyisocyanates having a blocked isocyanate group content of from 10.0 to 25.0 wt. %, C) optionally, further polyfunctional polyols, D) optionally, further cross-linking substances, E) optionally, external emulsifiers and F) optionally, conventional additives such as, for example, neutralising agents, catalysts, auxiliary substances and/or additives such as degassing agents, flow promoters, radical interceptors, antioxidants and/or UV absorbers, thickeners, small quantities of solvents and biocides with water to form an aqueous dispersion. The aqueous dispersion can be formed either by a direct dispersing process or by a phase reversal process, preferably by means of a dispersing device having a volume-related dispersing power of 1×10 to 9.8×10000 W/cm$^3$.

Dispersing devices which have a high volume-related dispersing power, e.g., pressure release-type homogenizing nozzles, can be used for producing the dispersions of the invention by dispersing processes.

Dispersing machines are known, for example, from Formation of Emulsions, in P. Beche, Encyclopedia of Emulsion Technology, Vol. 1, New York, Basle, Decker 1983, but they have not hitherto been used to produce aqueous dispersions which dry in pulverulent manner. The power range of the dispersing machine is according to the invention from 1×10 to 9.8×10000 W/cm$^3$, preferably 1×10 to 1×10000 W/cm$^3$, more preferably 1×10 to 1×1000 W/cm$^3$.

The choice of dispersing machine can depend on the amount of the volume-related power of the dispersing machine. Dispersing machines having high volume-related power, for example high-pressure homogenizers, are necessary for producing finely divided dispersions (approximately 1 μm particle diameter). Such finely divided dispersions are not readily producible on rotor/stator-type machines. The jet disperser described in EP-A 0,101,007 has a special pressure release-type nozzle which achieves an efficiency which is substantially higher than that of high-pressure homogenizers. Particle size distributions which on the high-pressure homogenizer require 200 bar pressure are obtained at as little as 50 bar homogenization pressure on the jet disperser.

Particularly advantageously finely divided dispersions can be produced in both continuous and batch-wise operation, using the jet disperser as the dispersing device.

According to the invention, the aqueous dispersion can also be converted by phase reversal from a water-in-oil to an oil-in-water emulsion.

The aqueous powder coating compositions of the invention may be used in stoving finish applications on any heat-resistant substrates, for example, as a clear coating or a pigmented coating for producing one-coat and multi-coat finishes, for example, in the automotive sector.

The polyol component A) of the aqueous coating includes:

a) from 0 to 100 parts by weight of a polyester component comprising at least one polyester polyol having a hydroxyl value of from 20 to 240 mg KOH/g at an acid value of <12 mg KOH/g and a glass transition temperature of from −40 to +100° C., b) from 0 to 15 parts by weight of an olefinically unsaturated ester component comprising at least one maleic acid di(cyclo)alkyl ester having 1 to 12 carbon atoms in the (cyclo)alkyl radical, c) from 0 to 70 parts by weight of (cyclo)alkyl esters of acrylic and/or methacrylic acid having 1 to 18 carbon atoms in the (cyclo)alkyl radical, d) from 0 to 50 parts by weight of aromatic olefinically unsaturated monomers, e) from 0 to 50 parts by weight of hydroxyalkyl esters of acrylic and/or methacrylic acid having 2 to 6 carbon atoms in the hydroxyalkyl radical, and/or reaction products thereof with s-caprolactone having a maximum molecular weight of 500, as well as addition products of acrylic and/or methacrylic acid and monoepoxy compounds, which may also be generated in situ during the free-radical polymerization, f) from 0 to 5 parts by weight of olefinically unsaturated carboxylic acids, and g) from 0 to 30 parts by weight of further copolymerizable olefinically unsaturated compounds;

wherein the sum of the parts by weight of the components a) to g) is 100.

The polyol component A) has a hydroxyl group content of from 1 to 6 wt. %, preferably 1.5 to 5.5 wt. % and more preferably 2 to 5 wt. %. The carboxyl group content is about 0 to 1.5 wt. %, preferably from 0.1 to 1.4 wt. % and more preferably 0.2 to 1.3 wt. %. The molecular weight determinable by gel permeation chromatography (weight average, polystyrene standard) is about 2000 to 50000, preferably 2500 to 40000 and more preferably 3000 to 35000. The glass transition temperature measured by differential thermal analysis (DTA) is about $\geq$30° C., preferably about 30 to 100° C. and more preferably about 30 to 80° C.

The polyol component A) preferably includes:

a) from 0 to 60 parts by weight of a polyester component comprising at least one polyester polyol having a hydroxyl value of from 30 to 200 mg KOH/g at an acid value of <10 mg KOH/g and a glass transition temperature of from −30 to +70° C., b) from 0 to 12.5 parts by weight of an olefinically unsaturated ester component comprising at least one maleic acid di(cyclo)alkyl ester having 1 to 6 carbon atoms in the (cyclo)alkyl radical, c) from 5 to 65 parts by weight of (cyclo)alkyl esters of acrylic and/or methacrylic acid having 1 to 12 carbon atoms in the (cyclo)alkyl radical, d) from 0 to 45 parts by weight of styrene, (-methylstyrene and/or vinyl toluene, e) from 5 to 45 parts by weight of hydroxyalkyl esters of acrylic and/or methacrylic acid having 2 to 4 carbon atoms in the hydroxyalkyl radical, and/or reaction products thereof with ε-caprolactone having a maximum molecular weight of 500, as well as addition products of acrylic and/or methacrylic acid and monoepoxy compounds, which may also be generated in situ during the free-radical polymerization, f) from 0 to 4 parts by weight of acrylic acid, methacrylic acid, maleic acid, fumaric acid and/or maleic or fumaric acid semiesters having 1 to 8 carbon atoms in the alcohol radical, g) from 0 to 25 parts by weight of further copolymerizable olefinically unsaturated compounds, wherein the sum of the parts by weight of the components a) to g) is 100.

The component A) more preferably includes:

a) from 0 to 40 parts by weight of a polyester component comprising at least one polyester polyol having a hydroxyl value of from 40 to 160 mg KOH/g at an acid value of <8 mg KOH/g and a glass transition temperature of from −30 to +60° C., b) from 1 to 10 parts by weight of maleic acid dimethyl ester, maleic acid diethyl ester, maleic acid dibutyl ester or mixtures of the latter monomers, c) from 10 to 60 parts by weight of (cyclo)alkyl esters of acrylic and/or methacrylic acid having 1 to 9 carbon atoms in the (cyclo)alkyl radical, d) from 5 to 45 parts by weight of styrene, e) from 10 to 42.5 parts by weight of hydroxyethyl acrylate, hydroxyethyl methacrylate, hydroxypropyl acrylate, hydroxypropyl methacrylate, hydroxybutyl acrylate and/or hydroxybutyl methacrylate and f) from 0.5 to 4 parts by weight of acrylic acid and/or methacrylic acid, wherein the sum of the components a) to f) is 100.

The polyester component a) of the polyol component A contains at least one hydroxy-functional polyester having a hydroxyl value of from about 20 to about 240 mg KOH/g, preferably from about 30 to about 200 mg KOH/g and more preferably from about 40 to about 160 mg KOH/g. The acid value is less than about 12 mg KOH/g, preferably less than about 10 mg KOH/g and more preferably less than about 8 mg KOH/g. The glass transition temperature of the polyester component a) is about −40 to +100° C., preferably −30 to +80° C. and more preferably −30 to +60° C. The molecular weight of the polyester polyols, which can be calculated from the stoichiometry of the starting materials used, is about approximately 460 to 11300 g/mol, preferably about 570 to 7500 g/mol and more preferably about 700 to 5700 g/mol. A total of 6 groups of monomer constituents may be used in the preparation of the hydroxy-functional polyesters:

1) (cyclo)alkane diols (i.e., dihydric alcohols having (cyclo)aliphatically bound hydroxyl groups) within the molecular weight range 62 to 286 such as, for example, ethanediol, 1,2- and 1,3-propanediol, 1,2-, 1,3- and 1,4-butanediol, 1,5-pentanediol, 1,6-hexanediol, neopentyl glycol, 1,4-cyclohexanedimethanol, 1,2- and 1,4-cyclohexanediol, 2-ethyl-2-butylpropanediol, ether oxygen-containing diols such as, for example, diethylene glycol, triethylene glycol, tetraethylene glycol, dipropylene glycol, tripropylene glycol, polyethylene glycol, polypropylene glycol or polybutylene glycol of a maximum molecular weight of approximately 2000, preferably approximately 1000 and more preferably approximately 500. Reaction products of the aforementioned diols with ε-caprolactone may likewise be used as diols, 2) trihydric and higher alcohols within the molecular weight range 92 to 254 such as, for example, glycerol, trimethylolpropane, pentaerythritol, dipentaerythritol and sorbitol, reaction products of the latter alcohols with ethylene oxide and/or propylene oxide or with ε-caprolactone up to a maximum molecular weight of approximately 2000, preferably approximately 1000, 3) monoalcohols such as, for example, ethanol, 1- and 2-propanol, 1- and 2-butanol, 1-hexanol, cyclohexanol and benzyl alcohol, reaction products of the latter alcohols with ethylene oxide and/or propylene oxide or with ε-caprolactone up to a maximum molecular weight of approximately 2000, preferably approximately 1000 and more preferably approximately 500, 4) dicarboxylic acids within the molecular weight range 116 to approximately 600 and/or anhydrides thereof such as, for example, phthalic acid, phthalic anhydride, isophthalic acid, tetrahydrophthalic acid, tetrahydrophthalic anhydride, hexahydrophthalic acid, hexahydrophthalic anhydride, maleic anhydride, fumaric acid, succinic acid, succinic anhydride, adipic acid, dodecanedioic acid, hydrogenated dimeric fatty acids, 5) higher-functional carboxylic acids or anhydrides thereof with, for example, trimellitic acid and trimellitic anhydride and 6) monocarboxylic acids such as, for example, benzoic acid, cyclohexane-carboxylic acid, 2-ethylhexanoic acid, hexanoic acid, octanoic acid, decanoic acid, dodecanoic acid, natural and synthetic fatty acids.

Any mixtures of the monomer constituents 1) to 6) may be used in preparing the polyester component a) of the polyol component A, with the proviso that they are selected such that the resulting polyesters have both OH values within the range of 20 to 240 mg KOH/g at acid values of <12 mg KOH/g and glass transition temperatures of from −40 to +100° C.

This condition is fulfilled when a suitable ratio of "softening" monomer constituents which bring about a lowering of the glass transition temperature of the polyesters, to "hardening" monomers which bring about a raising of the glass transition temperature, is used in the preparation of the polyesters.

"Softening" monomer constituents are, for example, aliphatic diols such as, for example 1,4-butanediol, 1,5-pentanediol and 1,6-hexanediol, or aliphatic dicarboxylic acids such as, for example, adipic acid or dodecanedioic acid.

"Hardening" monomer constituents are, for example, cyclic aromatic dicarboxylic acids such as, for example, phthalic acid, isophthalic acid and terephthalic acid, or diols such as, for example, 1,4-cyclohexanediol, 1,4-cyclohexanedimethanol or neopentyl glycol.

The polyester component a) is prepared in a known manner such as those methods described in detail in "Ullmanns Encyclopädie der technischen Chemie" [Ullmann's Encyclopaedia of Industrial Chemistry], Verlag Chemie Weinheim, 4th edition (1980), Vol. 19, pp. 61 et seq., or in H. Wagner and H. F. Sarx, "Lackkunstharze" [Synthetic Resins for Coatings], Carl Hanser Verlag, Munich (1971), pp. 86 to 152, for example. The esterification takes place optionally in the presence of a catalytic quantity of a conventional esterification catalyst such as, for example, acids such as, for example, p-toluenesulfonic acid, bases such as, for example, lithium hydroxide, or transition metal compounds such as, for example, titanium tetrabutylate, at approximately 80 to 260° C., preferably 100 to 240° C.

The esterification reaction is carried out until the desired values for the hydroxyl value and the acid value are reached. The molecular weight of the polyester polyols can be calculated from the stoichiometry of the starting materials (taking account of the resulting hydroxyl values and acid values).

The component b) of the polyol component A comprises at least one maleic acid di(cyclo)alkyl ester having 1 to 12, preferably 1 to 8 and more preferably 1 to 4 carbon atoms in the (cyclo)alkyl radical. Maleic acid dimethyl ester, maleic acid diethyl ester, maleic acid di-n-butyl ester, maleic acid di-2-ethylhexyl ester, maleic acid di-n-decyl ester, maleic acid di-n-dodecyl ester and maleic acid dicyclohexyl ester are, for example, suitable.

The component c) of the polyol component A comprises at least one (cyclo)alkyl ester of acrylic and/or methacrylic acid having 1 to 18, preferably 1 to 12 and more preferably 1 to 9 carbon atoms in the (cyclo)alkyl radical, such as, for example, methyl (meth)acrylate, ethyl (meth)acrylate, propyl (meth)acrylate, isopropyl (meth)acrylate, n-butyl (meth) acrylate, isobutyl (meth)acrylate, tert-butyl (meth)acrylate, cyclohexyl (meth)acrylate, 2-ethylhexyl (meth)acrylate, isobornyl (meth)acrylate, 3,3,5-tri-methylcyclohexyl (meth) acrylate, stearyl (meth)acrylate and benzyl (meth)acrylate.

The component d) of the polyol component A comprises at least one aromatic olefinically unsaturated monomer such as, for example, styrene, ϵ-methylstyrene and vinyl toluene. Styrene is preferred.

The component e) of the polyol component A comprises at least one hydroxyalkyl ester of acrylic and/or methacrylic acid having 2 to 6 carbon atoms in the hydroxyalkyl radical, and/or reaction products thereof with ϵ-caprolactone having a maximum molecular weight of 500, as well as addition products of acrylic and/or methacrylic acid and monoepoxy compounds, which may also be generated in situ during the free-radical polymerization. Hydroxyethyl (meth)acrylate, hydroxypropyl (meth)acrylate (isomer mixture arising from the addition of propylene oxide to (meth)acrylic acid), hydroxybutyl (meth)acrylate, reaction products of the latter monomers with ϵ-caprolactone up to a maximum molecular weight of 500, may, for example, be used. The term "hydroxyalkyl esters" should consequently also embrace radicals having ester groups, such as arise as a result of the addition of ϵ-caprolactone to simple hydroxyalkyl esters. Reaction products of acrylic and/or methacrylic acid with monoepoxy compounds, which may additionally also carry OH groups, should furthermore also be regarded as "hydroxyalkyl esters of (meth)acrylic acid" and are therefore likewise suitable as monomers e). Examples of suitable monoepoxides are ™$_{Cardura}$ E10 (Shell), 2-ethylhexylglycidyl ether and glycidol (1,2-epoxy-3-propanol). The latter reaction products may also be generated in situ under the reaction conditions of the free-radical polymerization.

The component f) of the polyol component A) comprises at least one olefinically unsaturated carboxylic acid such as, for example, acrylic acid, methacrylic acid, maleic acid, fumaric acid, maleic and/or fumaric acid semiesters having 1 to 18 carbon atoms in the alcohol radical, with acrylic acid and methacrylic acid being preferred.

The component g) of the polyol component A) comprises copolymerizable olefinically unsaturated compounds which are different from the compound classes of the components a) to f), such as, for example, β-olefines such as, for example, 1-octene or 1-decene; vinyl esters such as, for example, vinyl acetate, vinyl propionate, vinyl butyrate, VeoVa™ 9 and VeoVa™ 10, from Shell; other vinyl compounds such as, for example, N-vinyl pyrrolidone, N-vinyl caprolactam and N-vinyl carbazole.

The polyol component A) is prepared by free-radical polymerization of the components b) to g) either in an inert organic solvent without a solvent. The component a) is if necessary expediently introduced first, or it may, however, be used as a mixture with the monomer components b) to g) in the free-radical polymerization. It is, however, also possible to admix the component a) to the polymer which has resulted from the polymerization of the components b) to g). Any mixtures within the aforementioned quantitative limits may in each case be used as the feedstocks a) to g) when preparing the polyol component A), with the proviso that they are selected such that the resulting polyol binders have hydroxyl values and glass transition temperatures within the aforementioned ranges.

The latter conditions which are essential for the polyols to be usable according to the invention are fulfilled when a suitable ratio of "softening" monomers which bring about to a lowering of the glass transition temperature, to "hardening," monomers which bring about a raising of the glass transition temperature is used in the preparation of the copolymers.

"Softening" monomers are, for example, alkyl esters of acrylic acid such as, for example, ethyl acrylate, n-butyl acrylate, isobutyl acrylate and 2-ethylhexyl acrylate.

"Hardening" monomers are, for example, short-chain (cyclo)alkyl esters of methacrylic acid such as, for example, methyl methacrylate, ethyl methacrylate, isopropyl methacrylate, isobutyl methacrylate, tert-butyl methacrylate, cyclohexyl methacrylate, neopentyl methacrylate, isobornyl methacrylate and 3,3,5-trimethylcyclohexyl methacrylate; vinyl aromatics such as, for example, styrene, vinyl toluene and α-methyl styrene. Other softening and hardening monomers may be identified with routine experimentation.

Suitable initiators for carrying out the free-radical polymerization are conventional radical initiators such as aliphatic azo compounds, e.g., azodiisobutyric acid nitrile, azo-bis-2-methylvaleronitrile, 1,1'-azo-bis-1-cyclohexane nitrile and 2,2'-azo-bis-isobutyric acid alkyl ester; symmetrical diacyl peroxides such as, for example, acetyl, propionyl or butyryl peroxide, bromo-, nitro-, methyl- or methoxy group-substituted benzoyl peroxides, lauryl peroxides; symmetrical peroxydicarbonates, for example, diethyl, diisopropyl, dicyclohexyl and dibenzoyl peroxydicarbonate; tert-butylperoxy-2-ethylhexanoate, tert-butyl perbenzoate; hydroperoxides such as, for example, tert-butyl hydroperoxide, cumene hydroperoxide; dialkyl peroxides such as dicumyl peroxide; tert-butyl cumyl peroxide, di-tert-butyl peroxide or di-tert-amyl peroxide.

Suitable solvents for preparing the polyol component A) are, for example, solvents that can be removed from the aqueous phase of a dispersion by vacuum distillation following the emulsification step and as such are preferably inert to isocyanate groups. Ketones such as acetone and methyl ethyl ketone, and esters such as ethyl acetate and butyl acetate, might be named as examples.

When preparing the polyol binder A) (polyol component A), a reaction medium for the free-radical polymerization is introduced first into a polymerization reactor and is heated to the desired polymerization temperature. A solvent or a mixture of the aforementioned solvents, if provided for use the polyester component, or also the component b) may, for example, serve as the reaction medium. It is also possible to use any combinations of solvent and the components a) and/or b) as the reaction medium. After the desired polymerization temperature has been reached, the monomer mixture comprising the components c) to g) and optionally a) and/or b) and the radical initiator is dispensed into the reaction medium, preferably commencing simultaneously. The olefinically unsaturated constituents of the monomer mixture here undergo free-radical copolymerization, wherein optionally used polyester component a) can be bound chemically to the copolymer as a result of grafting reactions which may take place to a greater or lesser extent under the reaction conditions. The polyester component a) preferably has no unsaturated double bonds. In order, however, to obtain specific product properties, it may be appropriate to use polyesters which have polymerizable double bonds and are consequently able to enter into copolymerization reactions or grafting reactions.

The polymerization temperature is about 80 to 220° C., preferably about 90 to 200° C. and more preferably about 120 to 180° C.

Conventional regulators may be used when carrying out the polymerization, in order to regulate the molecular weight of the polyol binders. Mercaptans such as, for example, tert-dodecyl mercaptan, n-dodecyl mercaptan and mercaptoethanol might be named as examples of regulators.

The polymerization generally takes place, in particular if solvents of the aforementioned type are co-used, at a pressure of up to 20 bar in a sealed pressurised polymerization reactor having automatic temperature control. The polymerization may also be carried out at atmospheric pressure if working in solvent-free manner and using high-boiling monomer constituents which do not give rise to reflux at temperatures below that which is selected for the polymerization.

The polyol component A) obtained by the polymerization process that is described represents valuable binder components for the production of the aqueous powder suspensions according to the invention and forms the substantial polyol constituent, optionally alongside further hydroxyl group-containing components such as, for example, other polyesters, polyethers, polyacrylates, polycarbonates and/or polyurethanes, which may if needed be used in minor proportions alongside the polyol component A).

The polyisocyanate component B) includes principally polyisocyanates containing blocked (cyclo)aliphatic isocyanurate groups and optionally iminooxadiazine dione groups and/or biuret groups, as well as optionally urethane and/or allophanate groups. Known-(cyclo)aliphatic diisocyanates may be used to prepare the polyisocyanates. Preferably 1,6-diisocyanatohexane (HDI), 1-isocyanato-3,3,5-trimethyl-5-isocyanato-1-methyl cyclohexane (isophorone diisocyanate, IPDI), 2,4- and/or 2,6-diisocyanato-1-methyl cyclohexane and 4,4'-diisocyanatodicyclohexyl methane (Desmodur® W, from Bayer AG), are used. Polyisocyanates based on 1,6-hexamethylene diisocyanate, isophorone diisocyanate and Desmodur® W and containing isocyanurate groups or isocyanurate and iminooxadiazine dione groups are particularly preferred for the preparation of the component B).

4-Isocyanatomethyl octane-1,8-diisocyanate may be used as a further higher-functional polyisocyanate containing no functional groupings apart from the isocyanate groups, for the preparation of the polyisocyanate component B).

In order to prepare the polyisocyanate component B) the aforementioned polyisocyanates are blocked with conventional blocking agents in a blocking reaction which is known, and are optionally hydrophilically modified.

Known monofunctional blocking agents such as malonic acid diethyl ester, ethyl acetoacetate, ε-caprolactam, butanone oxime, cyclohexanone oxime, 1,2,4-triazole, dimethyl-1,2,4-triazole, 3,5-dimethyl pyrazole or imidazole are used as blocking agents. Blocking agents which are cleaved off within the temperature range up to 160° C., more preferably up to 150° C., are preferably used. Butanone oxime, cyclohexanone oxime and 3,5-dimethyl pyrazole are preferred, with 3,5-dimethyl pyrazole being particularly preferred.

If the polyisocyanate component is hydrophilically modified, this is effected by methods which are known, i.e., by reacting some of the isocyanate groups with hydroxy-carboxylic acids, for example 2,2-dimethylol propionic acid or 3-hydroxy-2,2-dimethyl propanoic acid (hydroxypivalic acid) and/or with monofunctional polyethers containing at least 70 wt. % ethylene oxide.

To prepare the cross-linking component B) (polyisocyanate component B), a polyisocyanate is reacted with the blocking agent and/or the hydroxycarboxylic acid and/or the polyether, either sequentially in any order or simultaneously. The polyisocyanates are preferably not rendered hydrophilic but are only blocked. The use of both a slight excess and a slight deficit of blocking agent is possible here. However, further processing may also take place if small amounts of unreacted isocyanate groups are still present in the reaction mixture. The reactions take place at from 0 to 120° C., preferably 20 to 120° C., wherein particularly the reactions with hydroxy-carboxylic acids are carried out under mild conditions in order to prevent reaction with the isocyanate groups by the carboxyl group as well.

The reactions may be carried out in a solvent-free manner or in an inert solvent. The reaction preferably takes place in inert solvents, wherein the aforementioned solvents, in particular ethyl acetate, acetone and methyl ethyl ketone, are preferably used.

When the reaction has finished, if hydrophilic properties have been imparted by a carboxylic acid, the incorporated carboxyl groups are optionally neutralized at least partially with a neutralizing agent. Suitable neutralizing agents are alkali metal or alkaline earth metal hydroxides, preferably, however, ammonia and amines such as, for example, triethylamine, triethanolamine, N-methylmorpholine, triethanolamine and more preferably N,N-dimethylethanolamine. The optionally present carboxyl groups are generally at least 50% neutralized, wherein an excess of neutralizing agent may optionally also be used.

Polyols C) which are optionally used are substances having at least one hydroxyl group. Such substances include but are not limited to the low molecular weight alcohols already described for the preparation of the polyester polyols, polyether alcohols having 1 to 6 terminal hydroxyl groups, polyurethane polyols having at least one terminal hydroxyl group, ε-caprolactone polyesters having at least one terminal hydroxyl group and/or polyols having carbonate groups and at least one terminal hydroxyl group.

The additional cross-linking component D) contains substances which, like the cross-linking substances B) (polyisocyanate component B), lead to curing of the coatings according to the invention as a result of chemical reaction with the hydroxyl groups of the polyol component A). Amino resins, for example corresponding melamine derivatives such as alkoxylated melamine resins or melamine-formaldehyde condensation products (for example FR-A 943 411, "The Chemistry of Organic Filmformers", pp. 235 to 240, John Wiley & Sons Inc., New York 1974), and conventional cross-linking agents, for example epoxides capable of reacting with alcoholic hydroxyl groups, phenolic resins, resol resins, urea resins or guanidine resins or mixtures thereof, should be named as examples.

To produce the coating compositions according to the invention the components A), B) and optionally C) to F) as described are mixed together, preferably in solvents which can be removed from the aqueous phase of a dispersion by vacuum distillation. Suitable solvents include but are not limited to acetone and methyl ethyl ketone, and esters such as ethyl acetate and butyl acetate, with ethyl acetate and methyl ethyl ketone being preferred, -and methyl ethyl ketone being particularly preferred. The components A) and B) can naturally also be prepared directly in solution and the latter solutions then be intermixed. The components A) and B) are more preferably prepared in methyl ethyl ketone and are then intermixed.

If so required and not previously effected, further polyfunctional cross-linking substances, neutralizing agents, small quantities of external emulsifiers as well as further auxiliary substances and additives such as, for example, thickeners, flow promoters, light stabilizers and/or catalysts, may optionally be introduced into the latter solution of A) and B).

The organic solution is then mixed with water in order to produce the aqueous suspensions. This takes place either by the direct dispersing process, wherein the organic phase is dispersed in the aqueous phase, or by the phase reversal process, wherein a water-in-oil emulsion initially present is converted into an oil-in-water emulsion with the aid of a dispersing device having a high volume-related dispersing power. The latter may include for example, cage-type stirrers, dissolvers, rotor/stator-type mixers, pressure release-type nozzles, preferably jet dispersers, wherein the volume-related dispersing power for the dispersing process is about 1×10 to 9.8×10000 W/cm$^3$, preferably 1×10 to 1×10000 W/cm$^3$ and more preferably 1×10 to 1×1000 W/cm$^3$. The average particle size of the aqueous dispersion or suspension particles is about 0.05 to 10 μm, preferably 0.1 to 5 μm, in particular 0. 15 to 2.5 μm and more preferably 0.2 to 1.5 μm.

In order to obtain specific particle size distributions, it may be practical or advantageous to effect dispersion in a plurality of stages at defined volume-related power.

There may be some advantage in first preparing a pre-emulsion by means of a stirrer or dissolver and then supplying the latter pre-emulsion to the jet disperser, before the dispersing operation takes place in the jet disperser. When producing the dispersions or emulsions, a quantity of water is used such as to result in 20 to 60 wt. %, preferably 30 to 60 wt. % and more preferably 35 to 60 wt. % dispersions or emulsions of the coating compositions according to the invention. When the addition of water is finished the solvent is preferably removed by vacuum distillation.

A dispersion may take place within a broad temperature range, both at a low temperature, for example from 0 to 20° C., and at a higher temperature which may markedly exceed the melting point of the polymer mixture, for example from 100 to 150° C.

A procedure which would, however, also be possible in principle for producing the aqueous dispersions or suspensions includes mixing, with an aqueous solution of a neutralizing agent of the type named, mixtures of A) and B) having, free carboxyl and hydroxyl groups and blocked isocyanate groups, optionally in the form of an organic solution in one of the solvents named by way of example, such that the neutralization and the dissolving or dispersing operations take place in single-stage manner.

The mixing ratio of the polyol component A) to the blocked polyisocyanate component B) is selected such that the equivalent ratio of blocked isocyanate groups of the component B) to alcoholic hydroxyl groups of the component A) is about 0.5:1 to 2:1, preferably about 0.7:1 to 1.5:1 and more preferably about0.8:1 to 1.2:1.

Further polyfunctional hydroxyl compounds C), polyfunctional cross-linking agents D), external emulsifiers E) and conventional additives F) may be added to the aqueous binder mixture, but also to the individual components A) and B) before they are combined or even during preparation, or to the mixture of A) and B) before or after dispersion.

The coating compositions according to the invention thus produced may be applied in one-coat or multi-coat manner to any heat-resistant substrates by methods which are known per se, for example by spraying, brushing, dipping, flowcoating, flooding or by roller or knife application.

Coatings are obtained, for example on metal, plastics material, wood or glass, by curing the coating at from 80 to 220° C., preferably 90 to 180° C. and more preferably 100 to 160° C.

The binders according to the invention are preferably suitable for producing coatings and finishes on optionally previously primed and optionally filled and undercoated steel sheets or other metal sheets such as are used, for example, in the manufacture of automotive or aviation components, machines, drums, panelling or containers. The coating films generally have a dry film thickness of from 0.01 to 0.3 mm.

The markedly lower solvent content is a noteworthy advantage over solvent-borne systems. By comparison with conventional water-borne coatings the markedly lower organic cosolvent content and the greater certainty of application which result from the larger application window are advantageous. The substantially reduced tendency to boil and an improved sag-resistance are also worthy of mention.

Noteworthy superiority over conventional powder coatings is afforded by the good flow at markedly reduced film thickness, the possibility of application using existing one-pack wet-coating plant, greater ease of plant cleaning, and the absence of disruptions on the coating line due to stray fine powders.

The invention is further illustrated but is not intended to be limited by the following examples in which all parts and percentages are by weight unless otherwise specified.

EXAMPLES

General Directions for Preparing a Polyester Polyacrylate Polyol or Polyacrylate Polyol Polyol Components (A1 and A2)

Polyol components A1 and A2 were prepared from three compositions designated below as "Part I," "Part II," and "Part III."

Part I was placed in a 10-litre special steel pressurised reactor fitted with stirring, cooling and heating equipment and with electronic temperature control, and was heated to the reaction temperature. Commencing simultaneously, Part II (addition over a total period of 3 hours) and Part III (addition over a total period of 3.5 hours) were then dispensed into the sealed reactor with the content of the reactor at virtually constant temperature (±2° C.). After the addition of Part III, post-stirring took place at the polymerization temperature for 1 hour. The resin solution which resulted was then cooled to 30° C. and filtered.

The reaction temperatures and the compositions of Parts I to III are shown in Table 1, together with the characteristic data of the products obtained.

Starting Material

Polyester: polyester polyol of hydroxyl value 98 mg KOH/g and acid value 1.5 mg KOH/g, was prepared by reacting 22.07 parts by weight of 2-ethylhexanoic acid, 30.29 parts by weight of trimethylolpropane, 12.67 parts by weight of neopentyl glycol, 32.24 parts by weight of hexahydrophthalic acid anhydride and 12.29 parts by weight of adipic acid.

TABLE I

Polyols A1 and A2 of the coating compositions according to the invention (quantities are given in g)

| Copolymer | A1 | A2 |
| --- | --- | --- |
| Part 1 | | |
| Methyl ethyl ketone | 2000 | 2000 |
| Polyester | 568 | — |
| Maleic acid dimethyl esterr | 284 | — |
| Part II | | |
| Methyl methacrylate | 1136 | 1136 |
| Styrene | 2037 | 1673 |
| Hydroxyethyl methacrylate | 922 | 1735 |
| Butyl methacrylate | 568 | — |
| Butyl acrylate | — | 852 |
| Acrylic acid | 51 | 57 |
| Part III | | |
| Di-tert.-butyl peroxide | 114 | 227 |
| Methyl ethyl ketone | 320 | 320 |
| Polymerization temperature | 160° C. | 160° C. |
| Characteristic data | | |
| Solids content (%) | 70 | 69.5 |
| Viscosity at 23° C., mPa.s | 1920 | 998 |
| Acid value, mg KOH/g | 5.8 | 7.6 |
| OH-value, mg KOH/g | 57 | 92 |
| Colour value, APHA | 40 | 31 |

Preparation of the Cross-linking Component B) Blocked Polyisocyanates B1 and B2) Polyisocyanate 1

1332 g isophorone dilsocyanate (IPDI) was placed under nitrogen in a 2-litre four-neck flask equipped with a stirrer, gas-entry tube, internal thermometer, dispensing funnel and reflux condenser, and was heated to 70° C. 15 ml of a 5 wt. % solution of 2-hydroxypropyl trimethylammonium hydroxide in 2-ethyl-1,3-hexanediol/methanol (6:1 parts by weight) was dispensed into the flask slowly and uniformly from a dispensing funnel within 45 minutes. The temperature increased to 88° C. as this took place (it should not exceed 90° C. because trimerization is non-specific at excessive temperatures and leads to higher end product viscosities). After the dispensing was finished, stirring was carried out at 80° C. until the reaction mixture reached an NCO content of 30.6%. The process was then shortstopped by the addition of 0.36 g (70 ppm molar) of a 25% solution of dibutyl phosphate in IPDI. Excess IPDI monomer was removed by thin film distillation. A 44% yield of a virtually colourless clear resin was obtained, which was dissolved at 70% concentration in methyl ethyl ketone. The viscosity of the solution at 23° C. was about 300 mPa.s, the isocyanate content was 11.8%, and the free IPDI monomer content was about 0.18%.

Polyisocyanate 2

™Desmodur N 3300 (Bayer AG), solids content: 100%; viscosity at 23° C.: 3500 mpa.s; isocyanate content 21.8%.

Preparation of a Blocked Polyisocyanate B1

500 g polyisocyanate 1 was placed in a 1-litre three-neck flask equipped with a stirrer, internal thermometer and reflux condenser, and was heated to 60° C. 134.8 g of 3,5-dimethylpyrazole was added portion-wise, with stirring, and stirring was then continued at 60° C. until no further isocyanate band is observable in the IR spectrum.

Preparation of a Blocked Polyisocyanate B2

150, methyl ethyl ketone was added to 350 g Desmodur N 3300 in a 1-litre three-neck flask equipped with a stirrer, internal thermometer and reflux condenser, and the batch was heated to 50° C., with stirring. 174.4 g of 3,5-dimethyl pyrazole was then added portion-wise, and stirring took place at 50° C. until no further isocyanate band was observable in the IR spectrum.

Example 1

Preparation of Aqueous Dispersions Which Dry Preferably in Pulverulent Manner

Dispersion 1

701.6 g of the polyester polyacrylate polyol A1 and 453.4 g of the blocked polyisocyanate B1 were dissolved in 1464.4 g methyl ethyl ketone (MEK), and 7.1 g of the neutralizing agent dimethylethanolamine were added. The following quantities of additives are then added: 6.5 g Byk 348 (flow promoter, from Byk-Chemie) and 10.5 g emulsifier WN (emulsifier from Bayer AG).

A water-in-oil emulsion was prepared from 2654 g of the solution of binder, neutralizing agent and additive in MEK by intensive intermixing with 1613.2 g water by means of a dissolver, and was then converted by phase reversal into an oil-in-water emulsion by passing through a jet disperser at elevated pressure (0.5 bar) according to EP 0 101 007. The MEK was distilled out under vacuum, and post-stabilization took place with 10.5 g emulsifier WN. A polymer dispersion having the following characteristic data resulted:

| Flow time (ISO 4-cup, 23° C.): | 15 sec. |
| --- | --- |
| Solids content: | 50% |
| Average particle size (laser correlation spectroscopy): | 0.90 µm |
| Glass transition temperature: | 62° C. |

Dispersion 2

1337.6 g of the polyacrylate polyol A2 and 1051.9 g of the blocked polyisocyanate B1 were dissolved in 2033 g methyl ethyl ketone (MEK), and 11.7 g of the neutralizing agent dimethylethanolamine were added. The following quantities of additives are then added: 17.4 g Byk 348 (flow promoter, from Byk-Chemie) and 52.3 g emulsifier NP 30 (emulsifier from Bayer AG).

A water-in-oil emuslion was prepared from 4000 g of the solution of binder, neutralizing agent and additives in MEK by intensive intermixing with 2154 g water by means of a dissolver, and was then converted by phase reversal into an oil-in-water emulsion by passing through a jet disperser at elevated pressure (1.0 bar) according EP 0 101 007. The MEK was distilled out under vacuum. After filtering (10 μm) a polymer-dispersion having the following characteristic data resulted:

| | |
|---|---|
| Flow time (ISO 4-cup, 23° C.): | 15 sec. |
| Solids content: | 49.7% |
| Average particle size (laser correlation spectroscopy): | 0.51 μm |
| Glass transition temperature: | 56° C. |

Dispersion 3

1812.0 g of the polyacrylate polyol A2, 911.4 g of the blocked polyisocyanate B1 and 372.1 g of the blocked polyisocyanate B2 were dissolved in 2620 g methyl ethyl ketone (MEK), and 16.0 g of the neutralizing agent dimethylethanolamine were added. The following quantities of additives are then added: 22.4 g Byk 348 (flow promoter, from Byk-Chemie) and 67.4 g emulsifier WN (emulsifier from Bayer AG).

A water-in-oil emulsion was prepared from 5000 g of the solution of binder, neutralizing agent and additives in MEK by intensive intermixing with 2618 g water by means of a dissolver, and was then converted by phase reversal into an oil-in-water emulsion by passing through a jet disperser at elevated pressure (1.0 bar) according EP 0 101 007. The MEK was distilled out under vacuum. After filtering (10 μm) a polymer dispersion having the following characteristic data resulted:

| | |
|---|---|
| Flow time (ISO 4-cup, 23° C.): | 15 sec. |
| Solids content: | 50,6% |
| Average particle size (laser correlation spectroscopy): | 0.33 μm |
| Glass transition temperature: | 45° C. |

Example 2

Application and Properties

The application and film properties of clear coatings are described by means of an example.

The following additives shown in Table 2 were added to the coating dispersions 1 until 3, which are adjusted to application viscosity:

TABLE 2

| Additive | Wt % solid/solid |
|---|---|
| Byk 348 (flow promoter from BYK-Chemie) | 1.5 |
| Tinuvin 292 (light stabiliser from Ciba-Geigy, Basle, 50% in butyl diglycol acetate) | 1.0 |
| Tinuvin 384 (UV absorber from Ciba-Geigy, Basle, 50% in | 1.5 |
| Borchigel LW 44 (thickener from Borchers GmbH, 10% in water) | 0.25 |

When the coating dispersions 1 until 3, formulated in this manner were applied to a surface and dried at room temperature, a pulverulent surface which can be readily removed with water formed.

When the aqueous dispersions were stoved immediately after application, a high-gloss coating film having good flow and good resistance to water, organic solvents and chemicals, was obtained.

The clear coatings produced were applied by means of a conventional commercial air mix spray gun to a metal sheet precoated with an aqueous cathodic electrodeposition coating, an aqueous filler film and an aqueous black undercoat film, such as are conventionally used in automotive original finishing.

Evaporation was allowed at room temperature for 2 minutes after application, and the sheets were then cured immediately at 150° C. for 30 minutes. The coating properties of the clear coating film based on the dispersions 1 until 3 are shown in Table 3 below.

TABLE 3

| Clear coating based on the dispersion | 1 | 1 | 3 |
|---|---|---|---|
| Film thickness, μm | 40 | 35 | 30 |
| Pendulum damping, König method s | 223 | 216 | 204 |
| Gloss, <20° | 91 | 84 | 86 |
| Water resistance, 24 hours at 23° C.1) | n.o.e. | n.o.e. | n.o.e. |
| Susceptibility to partial dissolution[2)], | | | |
| Xylene | 0 | 0 | 0 |
| 1 minute's exposure MPA | 0 | 0 | 0 |
| Ethyl acetate | 2 | 0 | 1 |
| Acetone | 2 | 2 | 1 |
| Resistance to chemicals[3)] 1% caustic soda | 50/50 | 60/60 | 51/60 |
| Swelling/etching, ° C. 1% sulphuric acid | 44/48 | 51/60 | 48/51 |

1)n.o.e. = no observable effect
[2)]0 = best value (no observable effect), 5 = worst value (film dissolved)
[3)]Gradient oven method:

The surface of the coating is exposed to the substance indicated at different temperatures in the gradient oven (from Byk-Gardner) for 30 minutes. The surface of the coating is cleaned afterwards, followed by visual evaluation. The impairment is expressed as ° C.

First value: first visible change as a result of swelling.

Second value: first visible change as a result of etching.

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A method of making an aqueous coating composition which comprises combining (i) a polyol component selected from the group consisting of polyester, polyacrylate and polyester polyacrylate polyols having a hydroxyl group content of from about 1.0 to about 6.0 wt %, a carboxyl group content from about 0 to about 1.5 wt %, a weight average molecular weight of 2000 to 50000 and a glass transition temperature that is ≧30° C.; and (ii) a polyisocyanate component comprising a member selected from the group consisting of aliphatic isocyanates and cycloaliphatic isocyanates having a blocked isocyanate group content of from about 10.0 to about 25.0 wt %, to form an organic phase and subsequently forming said aqueous coating composition by dispersing the organic phase in the aqueous phase by a direct dispersing process by means of a dispersing device having a volume-related dispersing power of 1×10 to 9.8×10000 W/cm$^3$.

2. The method of claim 1, wherein the dispersing device contains a pressure release-type homogenizing nozzle.

3. The method of claim 1 further comprising the step of combining the polyol component and the polyisocyanate component with a component selected from the group consisting of neutralizing agents, catalysts, auxiliary substances, degassing agents, flow promoters, radical interceptors, antioxidants, UV absorbers, thickeners, solvents, and biocides.

4. A method of making an aqueous coating composition which comprises combining
   (i) a polyol component selected from the group consisting of polyester, polyacrylate and polyester polyacrylate polyols having a hydroxyl group content of from about 1.0 to about 6.0 wt %, a carboxyl group content from about 0 to about 1.5 wt %, a weight average molecular weight of 2000 to 50000 and a glass transition temperature that is $\geq 30°$ C.; and
   (ii) a polyisocyanate component comprising a member selected from the group consisting of aliphatic isocyanates and cycloaliphatic isocyanates having a blocked isocyanate group content of from about 10.0 to about 25.0wt %, with water to form a water-in-oil emulsion and subsequently forming said aqueous coating composition by converting the water-in-oil emulsion to an oil in-water emulsion by a phase reversal process by means of a dispersing device having a volume-related dispersing power of $1 \times 10$ to $9.8 \times 10000$ W/cm$^3$.

5. The method of claim 4, wherein the dispersing device contains a pressure release-type homogenizing nozzle.

6. The method of claim 4 further comprising the step of combining the polyol component and the polyisocyanate component with a component selected from the group consisting of neutralizing agents, catalysts, auxiliary substances, degassing agents, flow promoters, radical interceptors, antioxidants, UV absorbers, thickeners, solvents, and biocides.

* * * * *